(12) United States Patent
Tahata

(10) Patent No.: US 7,561,154 B2
(45) Date of Patent: Jul. 14, 2009

(54) POWER SUPPLY CIRCUIT AND DISPLAY SYSTEM

(75) Inventor: Takashi Tahata, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 493 days.

(21) Appl. No.: 11/063,564

(22) Filed: Feb. 24, 2005

(65) Prior Publication Data

US 2005/0195182 A1  Sep. 8, 2005

(30) Foreign Application Priority Data

Feb. 25, 2004  (JP) ............................. 2004-049888

(51) Int. Cl.
*G06F 3/038* (2006.01)
(52) U.S. Cl. ......................... 345/211; 345/87
(58) Field of Classification Search .................. 345/52, 345/87, 89, 100, 204, 211; 327/536; 363/59, 363/60
See application file for complete search history.

(56) References Cited

U.S. PATENT DOCUMENTS 7,145,544 B2 * 12/2006 Oohira ........................ 345/99

7,184,011 B2 * 2/2007 Lee et al. ...................... 345/99
2002/0008566 A1 * 1/2002 Taito et al. .................. 327/536
2003/0052873 A1 * 3/2003 Ueda .......................... 345/211

FOREIGN PATENT DOCUMENTS

| CN | 1405749 | 3/2003 |
|----|---------|--------|
| JP | 6-250612 | 9/1994 |
| JP | 2001-183702 | 7/2001 |

* cited by examiner

*Primary Examiner*—Chanh Nguyen
*Assistant Examiner*—Pegeman Karimi
(74) *Attorney, Agent, or Firm*—Young & Thompson

(57) ABSTRACT

Disclosed is a device which includes an oscillation circuit for generating a reference clock signal CLK (osc), a display counter circuit for generating from the reference clock, a frame synchronization signal CLK (frm), a line selection reference clock signal CLK (drv), and a boost operation reference clock obtained on performing frequency multiplication of the line selection reference clock signal CLK (drv), a frequency divider circuit for inputting the frame synchronization signal CLK (frm) as a reset signal thereof and performing frequency division of the boost operation reference clock to output a boost operation clock signal CLK (dcdc), a boost circuit for performing charging and discharging operations according to the boost operation clock signal CLK (dcdc), and a driver circuit supplied with the boosted voltage of the boost circuit for driving a scan line selected the line selection reference clock signal CLK (drv).

18 Claims, 11 Drawing Sheets

FIG. 9 PRIOR ART
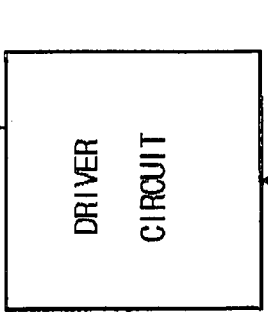
11 OSCILLATION CIRCUIT
CLK(osc) Fosc
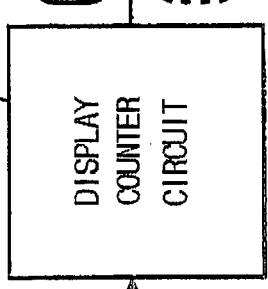
12 DISPLAY COUNTER CIRCUIT
CLK(drv) Fdrv
13 DRIVER CIRCUIT
POWER SUPPLY TO DRIVER
15 BOOST CIRCUIT
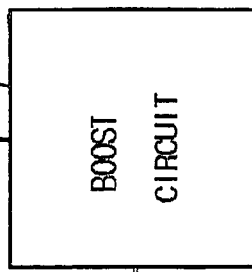
CLK(dcdc) Fdcdc
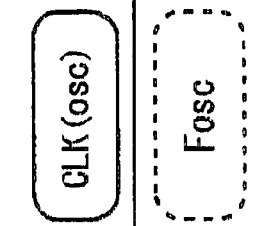
14 FREQUENCY DIVIDER CIRCUIT
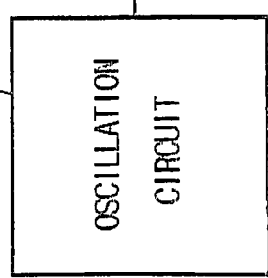

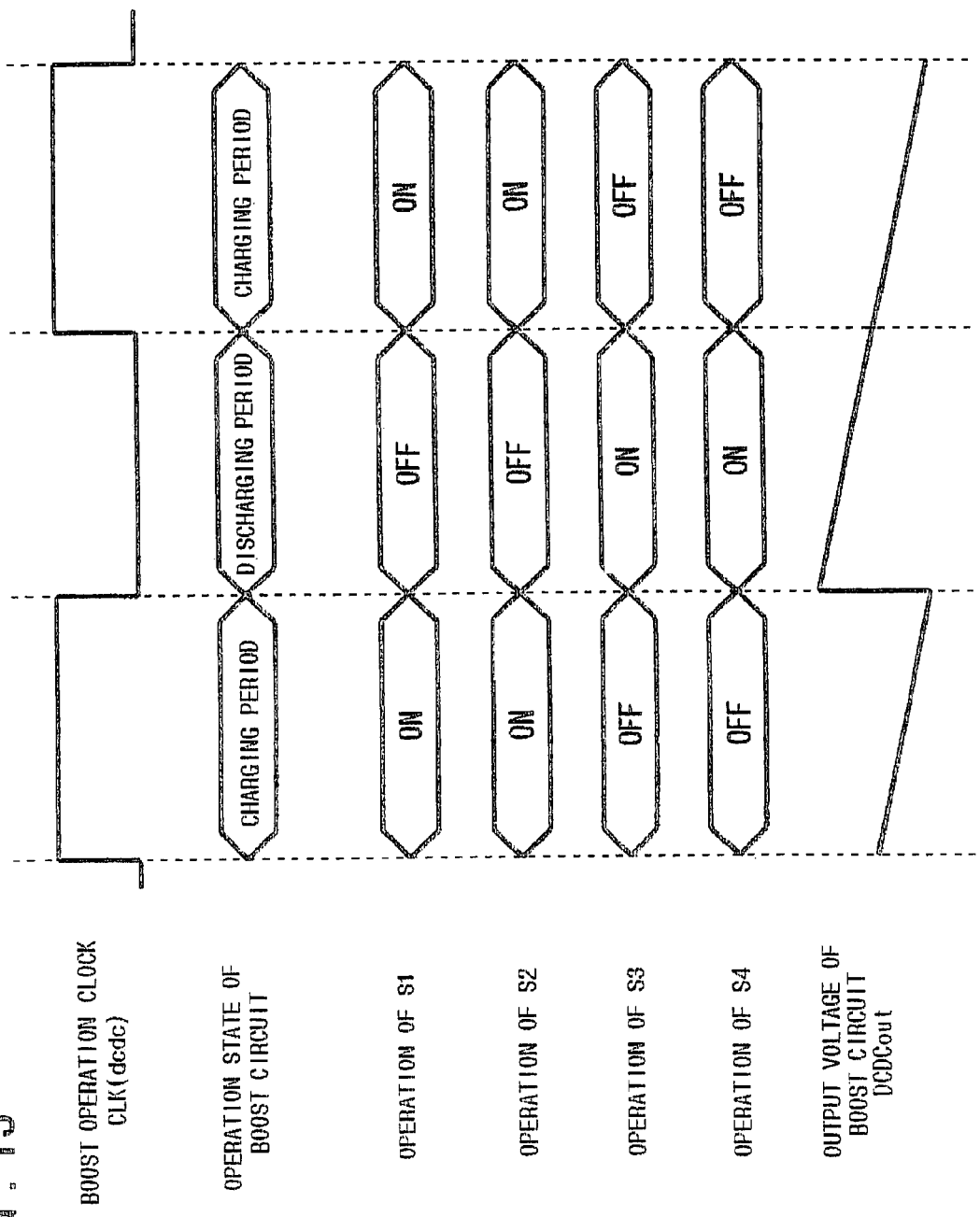

US 7,561,154 B2

POWER SUPPLY CIRCUIT AND DISPLAY SYSTEM

FIELD OF THE INVENTION

The present invention relates to a power supply circuit and a display system. More specifically, the invention relates to the power supply circuit suitable for use as a power source for a driver circuit for driving a liquid crystal panel and the display system equipped with the power supply circuit.

BACKGROUND OF THE INVENTION

FIG. 9 shows a configuration of a typical liquid crystal display system. In FIG. 9, an LCD (Liquid Crystal Display) panel is omitted, and a driver circuit for driving gate lines (scan lines) of the LCD panel, its power supply circuit, and a driving clock system are illustrated.

The typical liquid crystal display system includes an oscillation circuit 11 for generating a reference clock signal CLK (osc) for the display system, a display counter circuit 12 for generating a reference clock signal CLK (drv) for selecting a gate line, a driver circuit 13 for driving the gate lines (scan lines) of the LCD panel, a frequency divider circuit 14 for generating a clock signal CLK (dcdc) for a boost circuit 15, and the boost circuit 15 for supplying a power for a display driver. The frequency of the reference clock signal CLK (osc) is indicated by Fosc, the frequency of the line selection reference clock signal CLK (drv) is indicated by Fdrv, and the frequency of the boost operation clock signal CLK (dcdc) is indicated by Fdcdc. In the LCD panel, each gate line is connected in common to the gates of a plurality of pixel transistors (TFTs) for one line.

An operation of the liquid crystal display system shown in FIG. 9 is as follows:

The oscillation circuit 11 generates the reference clock signal CLK (osc) of the predetermined frequency Fosc, and supplies the reference clock signal CLK (osc) to the display counter circuit 12 and the frequency divider circuit 14.

The display counter circuit 12 divides the frequency of the input reference clock signal CLK (osc) by n, where n is a predetermined positive integer, to generate the line selection reference clock signal CLK (drv) for supplying the the line selection reference clock signal CLK (drv) to the driver circuit 13. The frequency Fdrv of the line selection reference clock signal CLK (drv) is equal to Fosc/n.

The frequency divider circuit 14 supplies the clock signal CLK (dcdc) obtained on dividing the frequency of the reference clock signal CLK (osc) by m to the boost circuit 15 as the boost operation clock signal CLK (dcdc) for controlling a boost operation. The frequency Fdcdc of the boost operation clock signal CLK (dcdc) equals to Fosc/m.

The boost circuit 15 performs the boost operation in synchronization with the clock signal CLK (dcdc) to supply the boosted voltage as a power supply voltage to the driver circuit 13.

FIG. 12 is a diagram for explaining the operation principle of the boost circuit 15 (which is a DC/DC converter). The boost circuit shown in FIG. 12 outputs from an output terminal DCDCout a voltage (2×VDD) which has been boosted to twice a reference power supply (VDD). The boost circuit includes a switch S1 having one terminal thereof connected to the power supply VDD, a charging capacitor C1 having one terminal thereof connected to the other terminal of the switch S1, a switch S3 having one terminal thereof connected to the power supply VDD and the other terminal thereof connected to the other terminal of the charging capacitor C1, a switch S2 connected between the other terminal of the charging capacitor C1 and a ground GND, a switch 4 having one terminal thereof connected to the one terminal of the charging capacitor C1 and the other terminal thereof connected to the output terminal DCDCout, and a smoothing capacitor C2 connected between the output terminal DCDCout and the ground GND.

FIG. 13 is a timing diagram showing an example of ON (conducting) and OFF (non-conducting) operations of the switches S1 to S4 in FIG. 12. As shown in FIG. 13, the switches S1 to S4 repeat ON and OFF operations in synchronization with the boost operation clock signal CLK (dcdc), thereby causing the boost circuit 15 to repeat charging and discharging periods to generate a boosted voltage. When the switches S1 and S2 are turned ON and the switches S3 and S4 are turned OFF, the charging capacitor C1 is charged, and the voltage of the output terminal DCDCout falls in response to discharging (a predetermined time constant) of the smoothing capacitor C2. When the switches S1 and S2 are turned OFF and switches S3 and S4 are turned ON, one terminal of the charging capacitor C1 is connected to the output terminal DCDCout and the other terminal of the charging capacitor C1 is connected to the supply voltage VDD. Thus, a boosted voltage in which the voltage across the terminals of the charging capacitor C1 is added to the supply voltage VDD is output to the output terminal DCDCout. The output voltage DCDCout of the boost circuit 15 has ripples synchronized with charging and discharging periods, as shown in FIG. 13. These ripples follows two conditions below described.

The resistance values of the switches S1 to S4 are zero.

The load current of the boost circuit is constant.

A configuration is known in which the switches S1 to S4 are constituted from thin-film transistors (TFTs), and a horizontal shift clock or a vertical shift clock for scanning a gate electrode is input to a frequency divider circuit as a DC/DC converter for supplying power to the gate electrode driver circuit of the LCD panel (refer to Patent Document 1 to be described hereinafter).

[Patent Document 1]

JP Patent Kokai JP-P2001-183702A (p. 5, FIG. 4, FIG. 5)

SUMMARY OF THE DISCLOSURE

In the conventional display system shown in FIG. 9, operation waveforms shown in FIG. 10 or FIG. 11 are generated. FIGS. 10 and 11 are timing waveform diagrams showing a set of waveforms of the reference clock signal CLK (osc) and the line selection reference clock signal CLK (drv) for the period of one frame (constituted from 10 lines), boost operation reference clock signal CLK (dcdc) and boosted voltage for a plurality of consecutive frames from a frame x to a frame x+2.

FIG. 10 is a timing waveform diagram showing operations when the relationship between the frequency division ratio m and the frequency division ratio n is expressed by m<n, or when the frequency (Fdcdc=Fosc/m) of the boost operation clock signal CLK (dcdc) is higher than the frequency (Fdrv=Fosc/n) of the line selection reference clock signal CLK (drv). During the selection period of one line, charging and discharging of the boost operation is performed more than once. In this case, if the boosted operation reference clock signal CLK (dcdc) is not synchronized with the line selection reference clock signal CLK (drv), the value of the boosted voltage at the time of data selection for each line differs according to the frame.

The boosted voltage at the time of selection of the second line in FIG. 10, for example, differs for each frame, as in a[V]->b[V]->c[V]->a[V]. When display onto the screen of the LCD is performed in this state, a wave is seen to flow on the screen.

On the other hand, FIG. 11 is a diagram showing timing waveforms when the relationship between m and n is expressed by m>n, or when the frequency (Fdcdc=Fsoc/m) of the boost operation reference clock signal CLK (dcdc) is lower than the frequency (Fdrv=Fosc/n) of the line selection reference clock signal CLK (drv) (when one boost operation (of charging and discharging is performed in the period of several lines). As shown in FIG. 11, the value of the boosted voltage at the time of data selection for each line also differs according to the frame. The boosted voltage at the time of selection of the second line in FIG. 11 differs for each frame, as in a[V], c[V], a[V], c[V]. When display onto the screen of the LCD is performed in this state, a wave is seen to flow on the screen.

In order to avoid the phenomenon in which the wave is seen to flow on the LCD screen without being synchronized with the frame, the number of clocks in one line is indicated by n (which is the CLK (drv) frequency division ratio n), the frequency division ratio of the boost circuit is indicated by m (which is the frequency division ratio m of the boost operation reference clock signal CLK (dcdc)), the number of lines of one frame is indicated by L, and a predetermined positive integer is indicated by k. Then, n, m, and L need to be adjusted so as to cause the relation expressed by the following equation (1) or (2) to be established, which will constrict the use of the display system.

$$n=2k \cdot m \quad (1)$$

$$n \cdot L=2k \cdot m \quad (2)$$

The condition indicated by the equation (1) corresponds to completion of the boost operation (charging and discharging) in one line, while the condition indicated by the equation (2) corresponds to completion of the boost operation (charging and discharging) in one frame.

Recently, in liquid crystal display systems for which lower power dissipation is demanded, a power supply circuit for supplying power to a driver circuit for liquid crystals is demanded to have:

lower current consumption;
as well as
stability of a supply power voltage and;
immunity to load variations.

The reduction of current consumption in the power supply circuit can be achieved by lowering the operating frequency of the circuit. However, if the operating frequency is lowered, the problem arises that the grade of displayed image quality is degraded.

A power supply circuit, in accordance with one aspect of the present invention, which supplies power to a driver circuit inputting a line selection reference clock signal for selecting a display line to drive a scan line, includes: a circuit for generating from an input reference clock signal a frame synchronization signal, the line selection reference clock signal, and a boost operation reference clock signal obtained on performing frequency multiplication or frequency division of the line selection reference clock signal; a circuit, operating in synchronization with the frame synchronization signal, for outputting a boost operation clock signal obtained on performing frequency division of the boost operation reference clock signal; and a boost circuit for performing charging and discharging according to the boost operation clock signal and supplying an output voltage thereof as a power supply voltage for the driver circuit.

A display system in accordance with another aspect of the present invention includes: a circuit for generating a boost operation clock signal synchronized with a frame synchronization signal generated from an input reference clock and with a line selection reference clock signal for selecting a display line; a boost circuit with charging and discharging operations thereof controlled by the boost operation clock signal; and a driver circuit for inputting the line selection reference clock signal, receiving the output voltage of the boost circuit as a power supply voltage therefor, and driving a scan line.

Preferably, a display system according to the present invention includes: an oscillation circuit for generating a reference clock signal; a counter circuit for inputting the reference clock signal and generating from the reference clock signal a frame synchronization signal, a line selection reference clock signal, and a boost operation reference clock signal obtained on performing frequency multiplication or frequency division of the line selection reference clock signal; a frequency divider circuit for inputting the frame synchronization signal as a reset signal thereof and outputting a boost operation clock signal obtained on performing frequency division of the boost operation reference clock signal; a boost circuit for performing charging and discharging according to the boost operation clock signal; and a driver circuit for inputting the line selection reference clock signal, receiving the output voltage of the boost circuit as a power supply voltage therefor, and driving a scan line selected by the line selection reference clock signal.

In the present invention, the boost operation clock signal supplied to the boost circuit is synchronized with the predetermined transition edge of the line selection reference clock signal and the predetermined edge of the frame synchronization signal.

In the present invention, the boost operation clock signal may be configured to have k clock cycles in the period of one line (wherein k is a predetermined positive integer not less than one). Alternatively, in the present invention, one clock cycle of the boost operation clock signal may be configured to include k cycles of the line selection reference clock signal (wherein k is a predetermined positive integer not less than two). In the present invention, the line selection reference clock signal is obtained by frequency division of the reference clock signal by the counter circuit by a predetermined frequency division ratio.

In the present invention, the frame synchronization signal is inserted into a back porch period. One frame may include a plurality of display periods, and the frame synchronization signal may be inserted into back porch periods prior to and subsequent to each display period. Alternatively, one frame may include a plurality of display periods, and the frame synchronization signal may be inserted into a back porch period prior to a certain one of the display periods.

The meritorious effect of the present invention are summarized as follows.

According to the present invention, by synchronizing the operation of the power supply circuit to the frame signal for display, the grade of displayed image quality can be enhanced, even if the operating frequency has been lowered to reduce current consumption.

For this reason, according to the present invention, both of lower power dissipation and a higher grade, which was considered to be remarkably difficult with the prior art, can be achieved.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 9 is a diagram for explaining a configuration of a conventional typical display system;

FIG. 13 is a timing waveform diagram for explaining an operation of the boost circuit in FIG. 12.

PREFERRED EMBODIMENTS OF THE INVENTION

Figure 1:
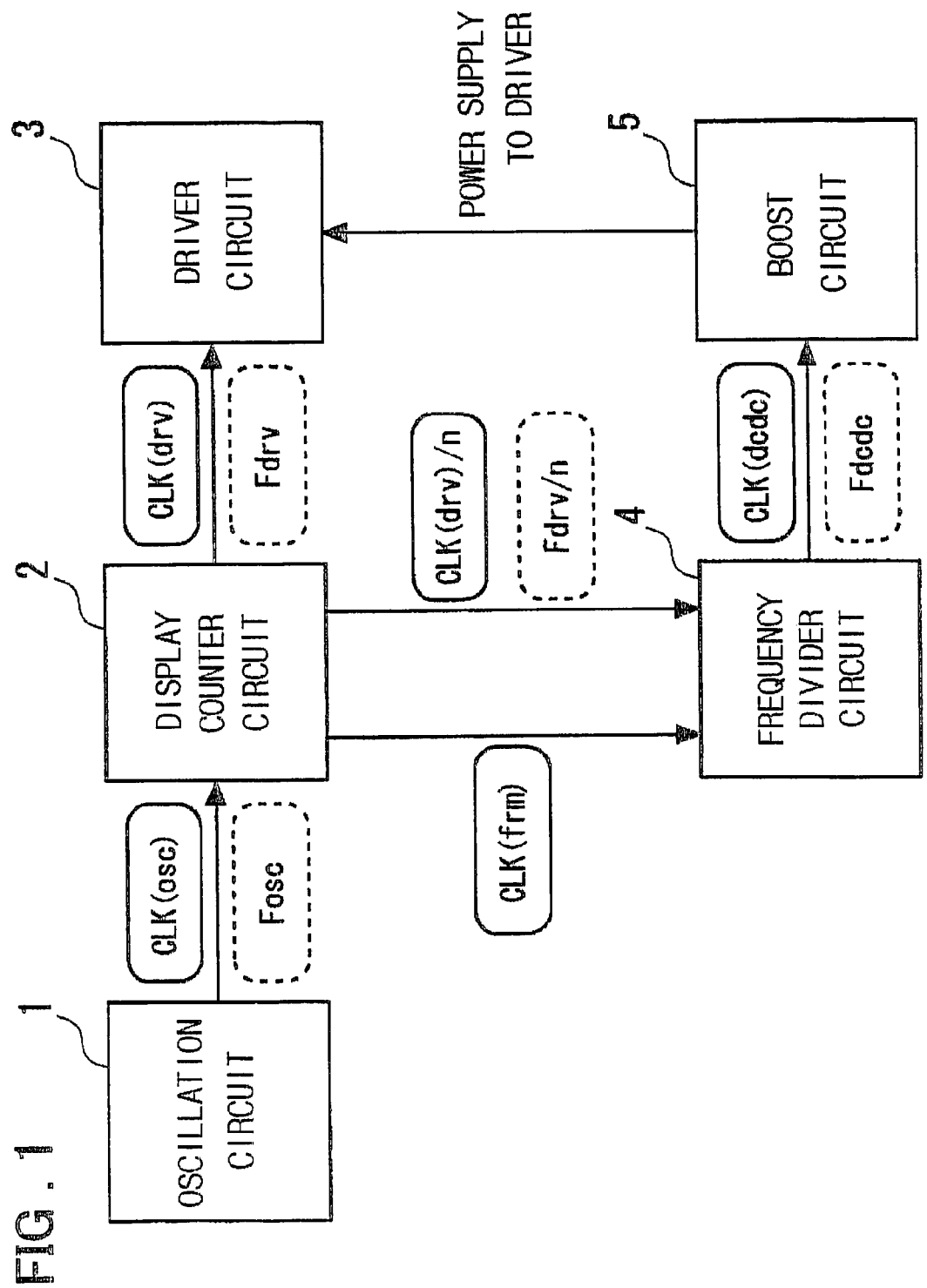
FIG. 1 is a diagram showing a configuration of an embodiment of the present invention.

In order to describe the present invention in further detail, a preferred embodiment will be described with reference to the appended drawings. FIG. 1 is a diagram showing a configuration of an embodiment of the present invention.

Figure 12:
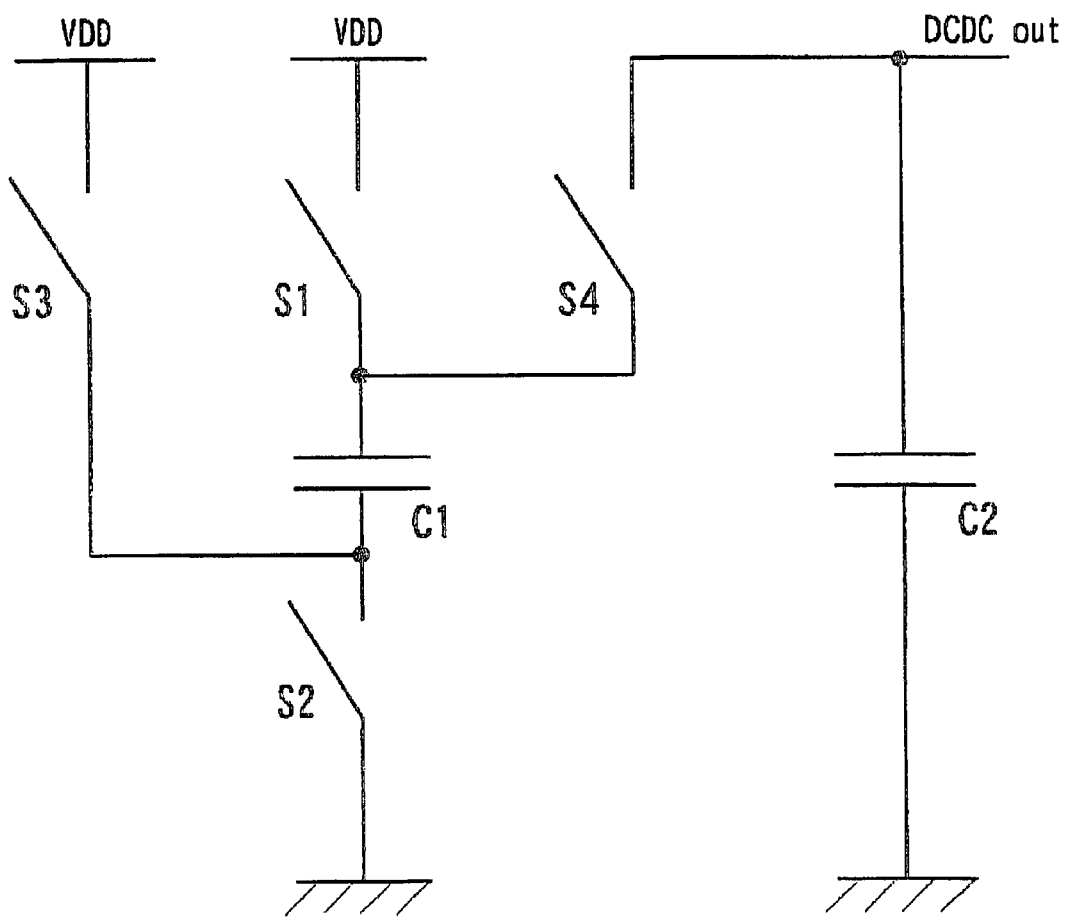
FIG. 12 is a diagram showing an example of a schematic configuration of a typical boost circuit.

Referring to FIG. 1, a display system according to the present embodiment includes an oscillation circuit 1 for generating a reference clock signal CLK (osc) of a predetermined frequency Fosc, a display counter circuit 2 for generating a frame synchronization signal CLK (frm), a line selection reference clock signal CLK (drv), and a boost operation reference clock signal CLK (drv)/n from the reference clock signal CLK (osc), a frequency divider circuit 4 for receiving the frame synchronization signal CLK (frm) at a reset terminal thereof and performing frequency division of the boost operation reference clock signal CLK (drv)/n to output a boost operation clock signal CLK (dcdc), a boost circuit 5 for performing charging and discharging responsive to the boost operation clock signal CLK (dcdc), and a driver circuit 3 for receiving the boosted voltage of the boost circuit 5 as a power supply voltage therefor and driving a gate line (a scan line) responsive to the line selection reference clock signal CLK (drv). The boost circuit 5 is assumed to have a configuration shown in FIG. 12, and perform a charging operation during the period in which the boost operation clock signal CLK (dcdc) is high, and perform a discharging operation during the period in which the boost operation clock signal CLK (dcdc) is low.

The display counter circuit 2 divides the frequency of the reference clock signal CLK (osc) by N, where N is a predetermined positive integer, to generate the line selection reference clock signal CLK (drv), for supplying the so generated line selection reference clock signal to the driver circuit 3. The display counter circuit 2 generates the boost operation reference clock signal CLK (drv)/n in synchronization with a transition of the line selection reference clock signal CLK (drv). The boost operation reference clock signal CLK (drv)/n is constituted from a clock that has been obtained by multiplying the frequency of the line selection reference clock signal CLK (drv) by n, where n is a predetermined positive integer. In this case, a frequency Fdrv/n of the boost operation reference clock signal CLK (drv)/n is n times a frequency Fdrv of the line selection reference clock signal CLK (drv) (its clock cycle is 1/n). Alternatively, the boost operation reference clock signal CLK (drv)/n may be generated by dividing the frequency of the line selection reference clock signal CLK (drv) by n. In this case, the frequency Fdrv/n of the boost operation reference clock signal CLK (drv)/n is one nth of the frequency Fdrv of the line selection reference clock signal CLK (drv). Since the boost operation clock signal CLK (dcdc) is generated by frequency multiplication of the line selection reference clock signal CLK (drv) (refer to FIG. 2, which will be described later) or frequency division of the line selection reference clock signal CLK (drv) (as shown in FIG. 3, which will be described later), the boost operation clock signal CLK (dcdc) is synchronized with the line selection reference clock signal CLK (drv) in either case.

Figure 2:
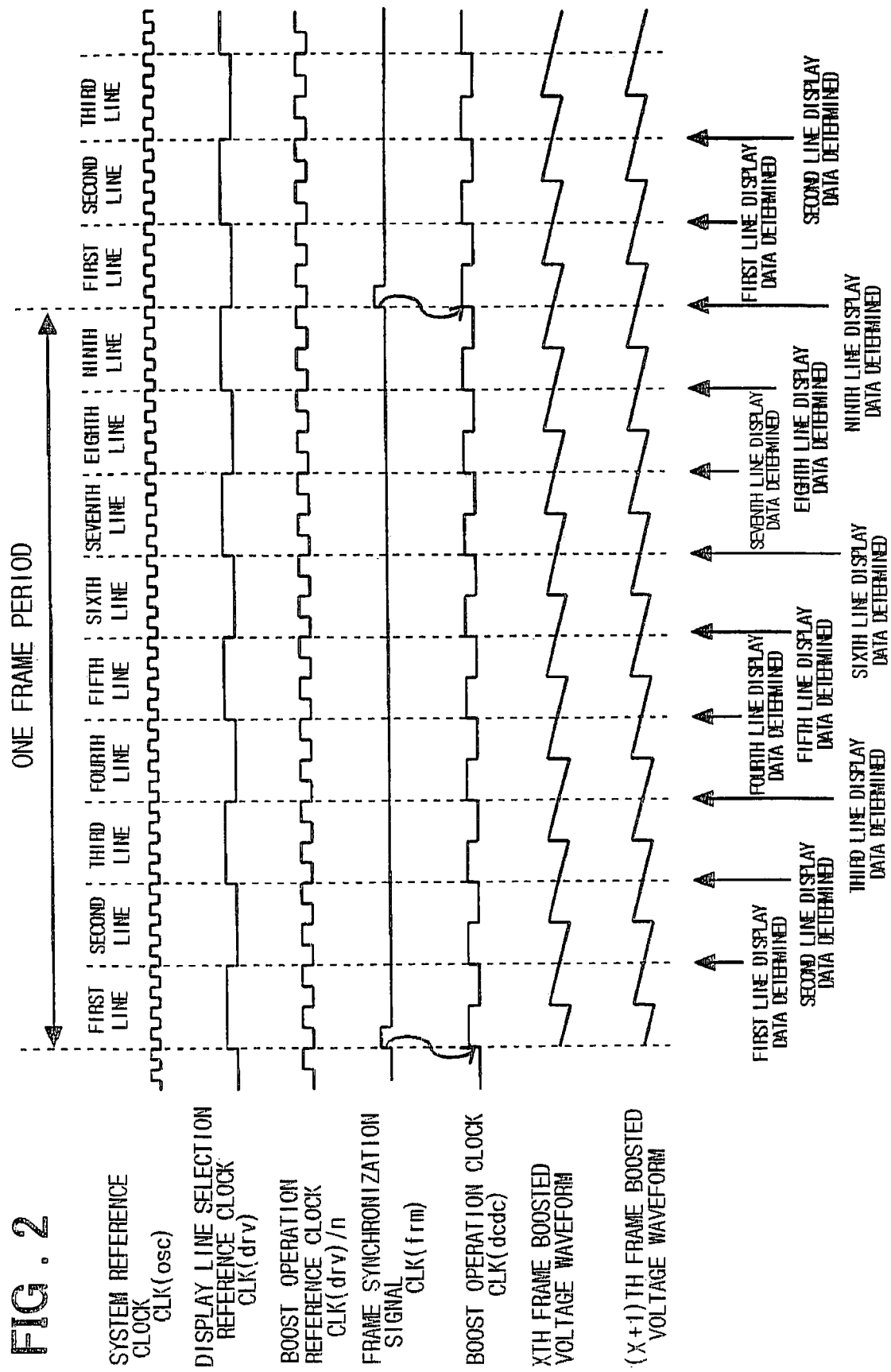
FIG. 2 is a timing waveform diagram for explaining an operation of the embodiment of the present invention.
Figure 3:
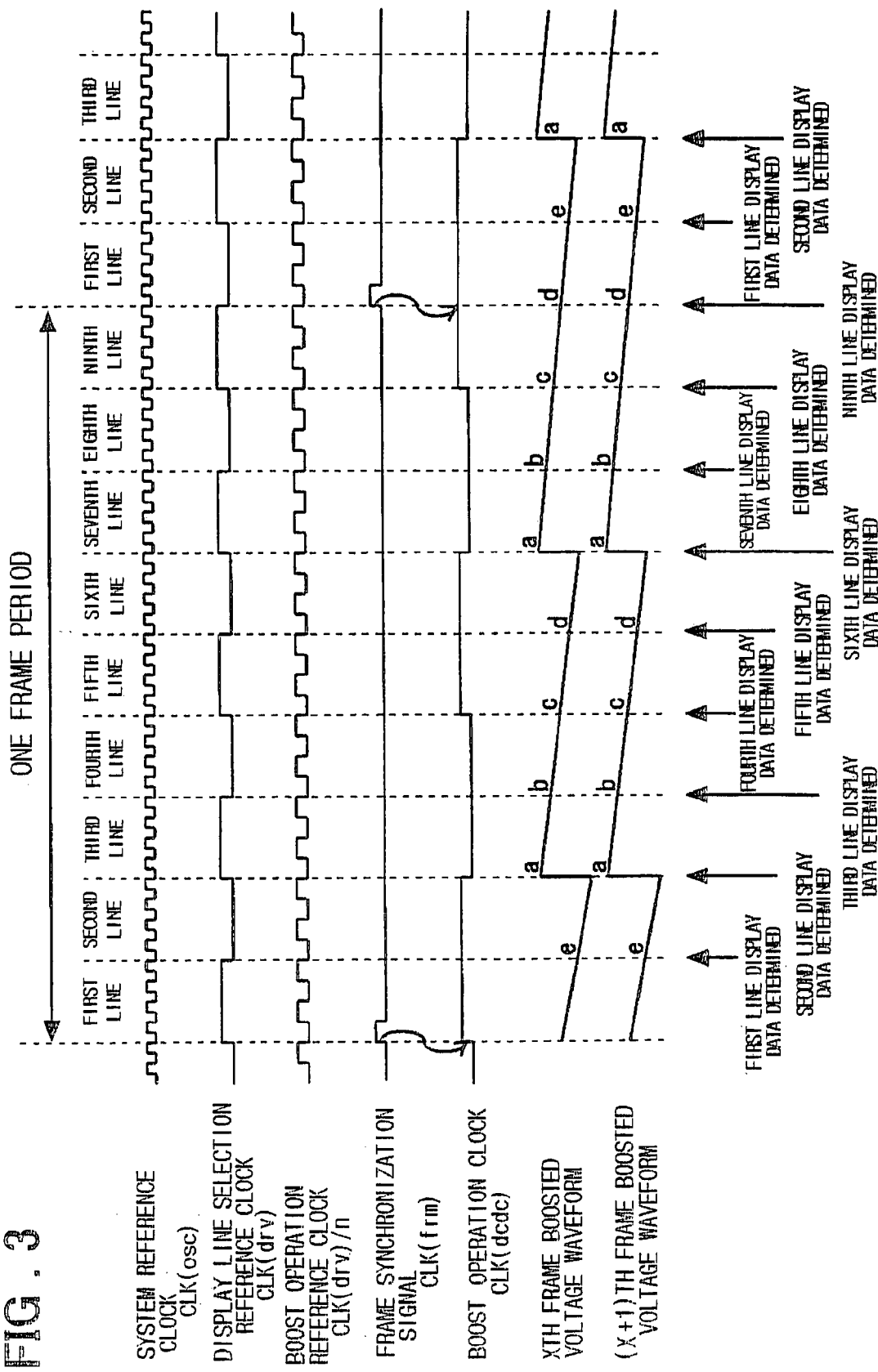
FIG. 3 is a timing waveform diagram for explaining an operation of the embodiment of the present invention.

FIG. 2 is a timing waveform diagram showing a specific example (embodiment) when a boost operation (charging and discharging) is performed once or more within the time of selection of one line in the embodiment of the present invention.

In the example shown in FIG. 2, the charging operation and the discharging operation of the boost circuit 5 is performed once, respectively. The boost circuit 5 performs charging and discharging during the respective periods in which the boost operation clock signal CLK (dcdc) is high and low, and one line period corresponds to one cycle of the boost operation clock signal CLK (dcdc).

In the example shown in FIG. 2, a frequency Fdcdc of the boost operation clock signal CLK (dcdc) input to the boost circuit 5 is twice the frequency Fdrv of the line selection reference clock signal CLK (drv). The frequency Fdrv/n of the boost operation reference clock signal CLK (drv)/n corresponds to four times the frequency Fdrv of the line selection reference clock signal CLK (drv) input to the driver circuit 3. The boost operation clock signal CLK (dcdc) is obtained by dividing the frequency of the boost operation reference clock signal CLK (drv)/n by two.

FIG. 2 shows timing waveforms showing a set of the reference clock signal CLK (osc) and the line selection reference clock signal CLK (drv) for the period of one frame (constituted from 10 lines), the boost operation reference clock signal CLK (dcdc), and boosted voltage waveforms for a plurality of consecutive frames (from a frame x to a frame x+2).

In the present embodiment, in the case where charging and discharging of the boost operation is performed once or more during the selection period of one line, the high grade of display quality can be obtained for the following reasons:

In the present embodiment, the boost operation clock signal CLK (dcdc) supplied from the frequency divider circuit 4 to the boost circuit 5 is generated by frequency dividing the boost operation reference clock signal CLK (drv)/n obtained by four times frequency multiplication of the line selection reference clock signal CLK (drv), by two.

For this reason, the boost circuit 5 performs the boost operation (constituted from charging and discharging) in synchronization with the line selection reference clock signal CLK (drv). More specifically, the boosted voltage at the timing of selection of display data for each line always becomes constant irrespective of lines and frames. This enables display of a uniform image without variations in color.

FIG. 3 is a diagram showing a case where one boost operation (constituted from charging and discharging) is performed in a period of several lines, in the embodiment of the present invention. In the example shown in FIG. 3, the boost circuit 5 performs charging and discharging during the period in which the boost operation clock signal CLK (dcdc) is high and the period in which the boost operation clock signal CLK (dcdc) is low, respectively. For one cycle of the boost operation clock signal CLK (dcdc), two clock cycles of the line selection reference clock signal CLK (drv) are provided. The boost operation clock signal CLK (dcdc) corresponds to the clock obtained by frequency division of the line selection reference clock signal CLK (drv) by two.

By the way, in the case where the boost operation (constituted from charging and discharging) is performed once or more during the selection period of one line, the operating frequency of the boost circuit needs to be increased. However, as described before, in an LCD module for mobile applications such as a cellular phone, current consumption must be reduced as much as possible.

When the operating frequency of the boost circuit 5 is lowered so as to reduce the current consumption of the boost circuit 5, the relationship among the number of lines in a frame indicated by L, the frequency division ratio (frequency division number) of the boost operation clock indicated by m, and the number of clocks in one line must be considered in the configuration of the conventional circuit shown in FIG. 9, as shown in the above formula (2). Thus the use of the system is constricted.

On contrast therewith, according to the present invention, the voltage operation clock signal CLK (dcdc) for the boost circuit 5 is synchronized at the certain location of each frame (the leading edge portion of a first line in FIG. 3), using the frame synchronization signal CLK (frm). The boosted voltage at the time of selection of display data in each line thereby becomes constant irrespective of the frame.

As described above, according to the present embodiment, the reference potential of data for each line is constant from one frame to another, irrespective of the frame. Thus, the grade of display of an LCD is improved. It means that the system with low current consumption is implemented without degrading the grade of display.

Figure 4:
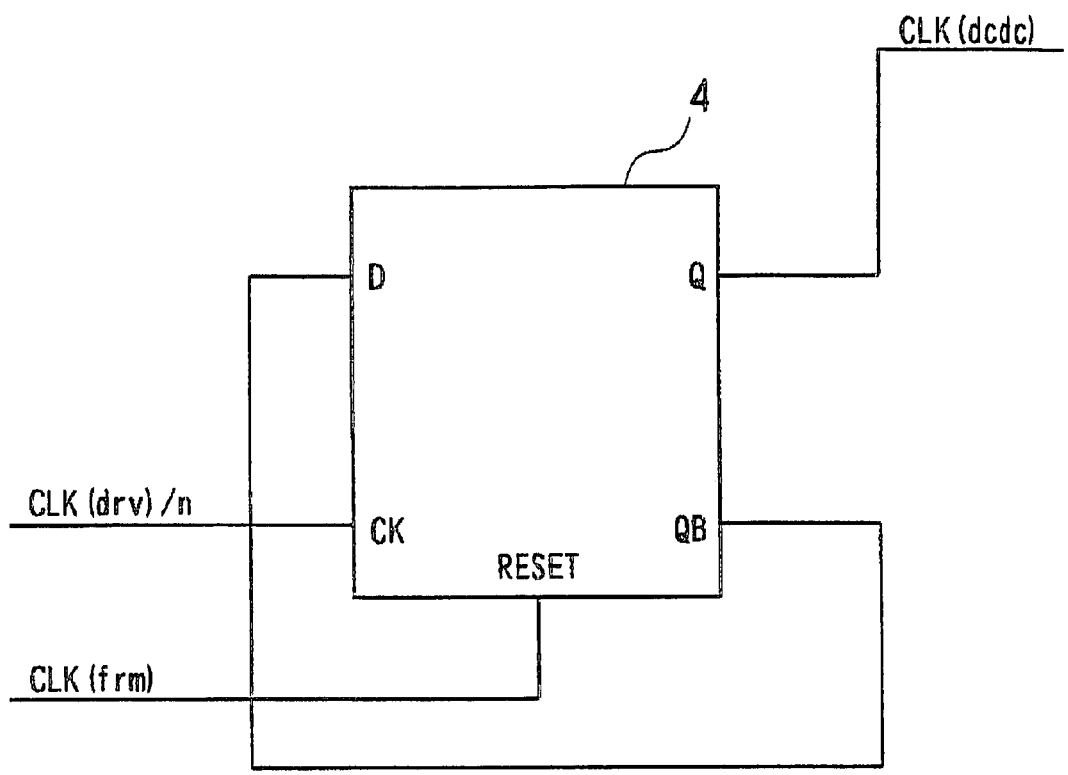
FIG. 4 is a diagram showing an example of a configuration of a frequency divider circuit in the embodiment of the present invention.

FIG. 4 is a diagram showing a specific example (embodiment) of the frequency divider circuit 4 in FIG. 1. Referring to FIG. 4, in this frequency divider circuit 4, a data output terminal (inverting terminal) QB of a D-type flip-flop is fed back to a data input terminal D. The boost operation reference clock signal CLK (drv)/n generated by the display counter circuit 2 is input to a clock input terminal CK, the frame synchronization signal CLK (frm) is input to a reset terminal RESET, and the clock signal CLK (dcdc) obtained by frequency division of the clock signal CLK (drv)/n by two is output from a data output terminal (non-inverting terminal) Q. By using the frame synchronization signal CLK (frm) for the reset terminal of the frequency divider circuit 1, the charging and discharging operations of the boost circuit 5 can be completely synchronized with a display line.

In the timing waveform diagram shown in FIG. 2, the boost operation reference clock signal CLK (dcdc) output from the frequency divider circuit 4 is obtained by dividing the frequency of the clock signal CLK (drv)/n by two in synchronization with the falling edge of the clock signal CLK (drv)/n. In this case, the frequency divider circuit 4 in FIG. 4 samples the value of the data input terminal D at the falling edge of the clock signal input to the clock terminal CK, for output from the data output terminal Q. Referring to the timing waveform diagram shown in FIG. 3, three of the frequency divider circuits in FIG. 4 are provided, and the frequency division ratio is set to be 8 ($=2^3$).

According to the present embodiment, since the charging and discharging operations of the boost circuit 5 can be completely synchronized with a display line, degradation of display such as the one on which a wave flows will not be generated.

Specific examples of the method of setting the frame synchronization signal used in the present embodiment will be described below with reference to FIGS. 5 through 7.

Figure 5:
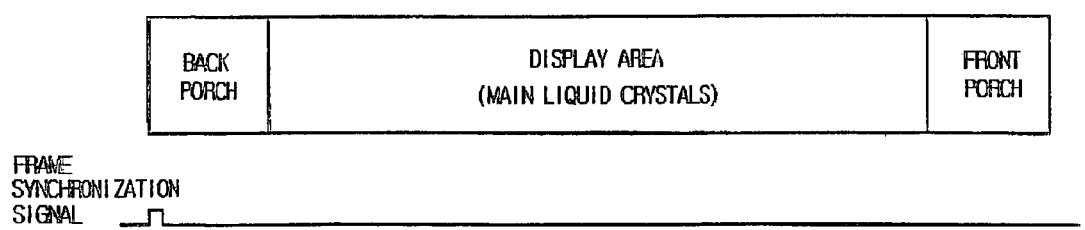
FIG. 5 is a diagram showing an example of a method of setting a frame synchronization signal in the embodiment of the present invention.

In the example shown in FIG. 5, the frame synchronization signal is inserted into a back porch period. Prior to and subsequent to the signal for displaying a frame, reduction of a discharging time or prolongation of a charging time may occur, so that temporary instability of an output may be considered. Accordingly, the frame synchronization signal is inserted into the back porch period which is the period that is not associated with display. This solves the temporary instability of the output.

Figure 6:
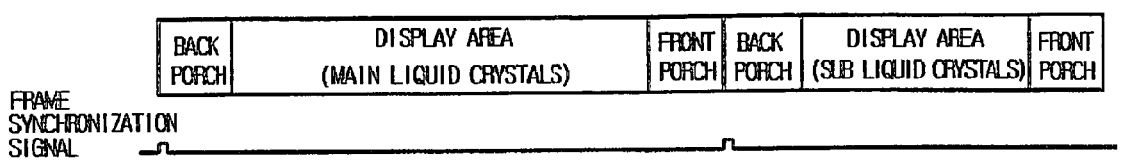
FIG. 6 is a diagram showing other example of the method of setting the frame synchronization signal in the embodiment of the present invention.
Figure 7:
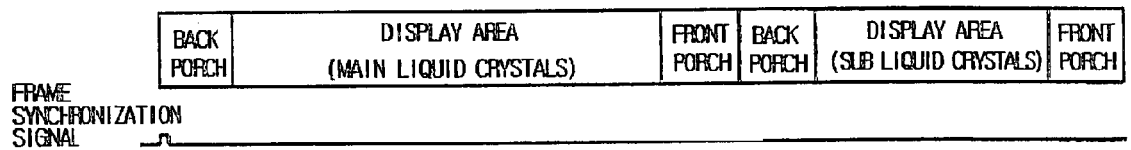
FIG. 7 is a diagram showing still other example of the method of setting the frame synchronization signal in the embodiment of the present invention.

FIGS. 6 and 7 show examples in which a plurality of display areas are present on one screen. In the example shown in FIG. 6, the synchronization signal is inserted into the back porch periods prior to and subsequent to each display period.

The example illustrated in FIG. 7 shows the case in which the frame signal is inserted into the back porch period prior to a certain display period.

Figure 8:
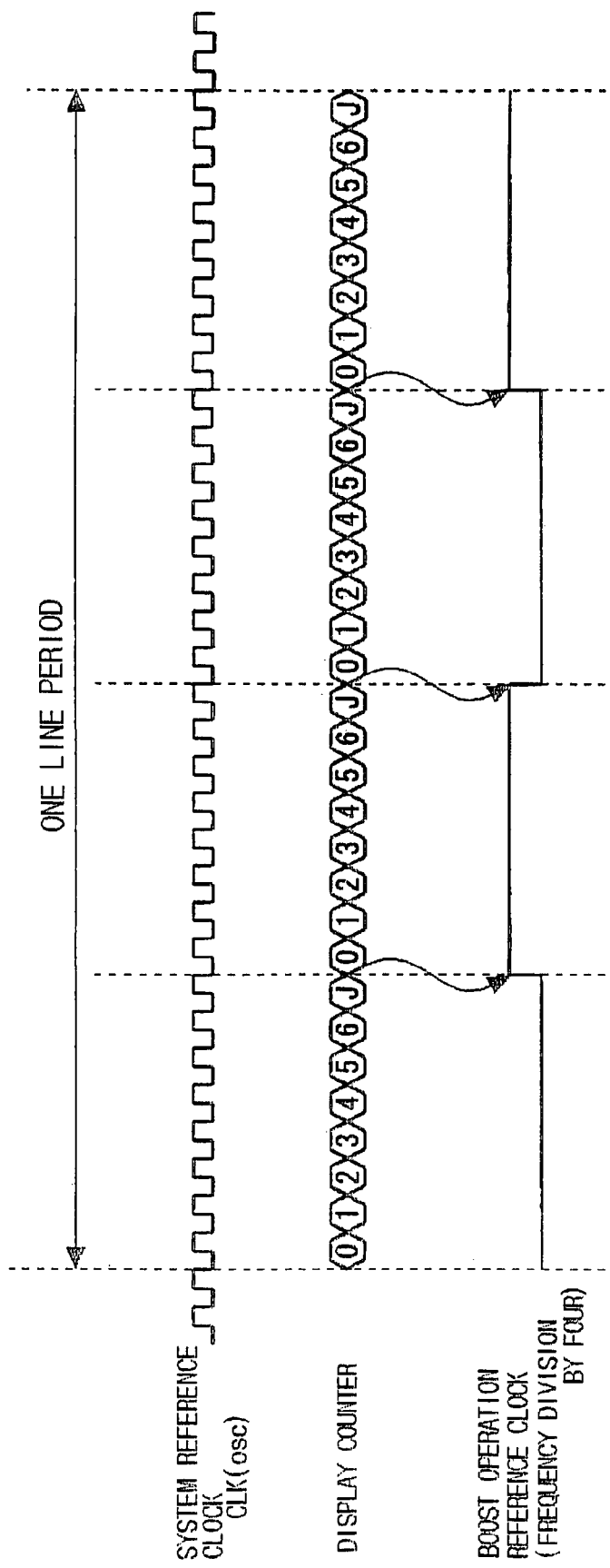
FIG. 8 is a diagram showing generation of a boost operation reference clock in the embodiment of the present invention.
Figure 10:
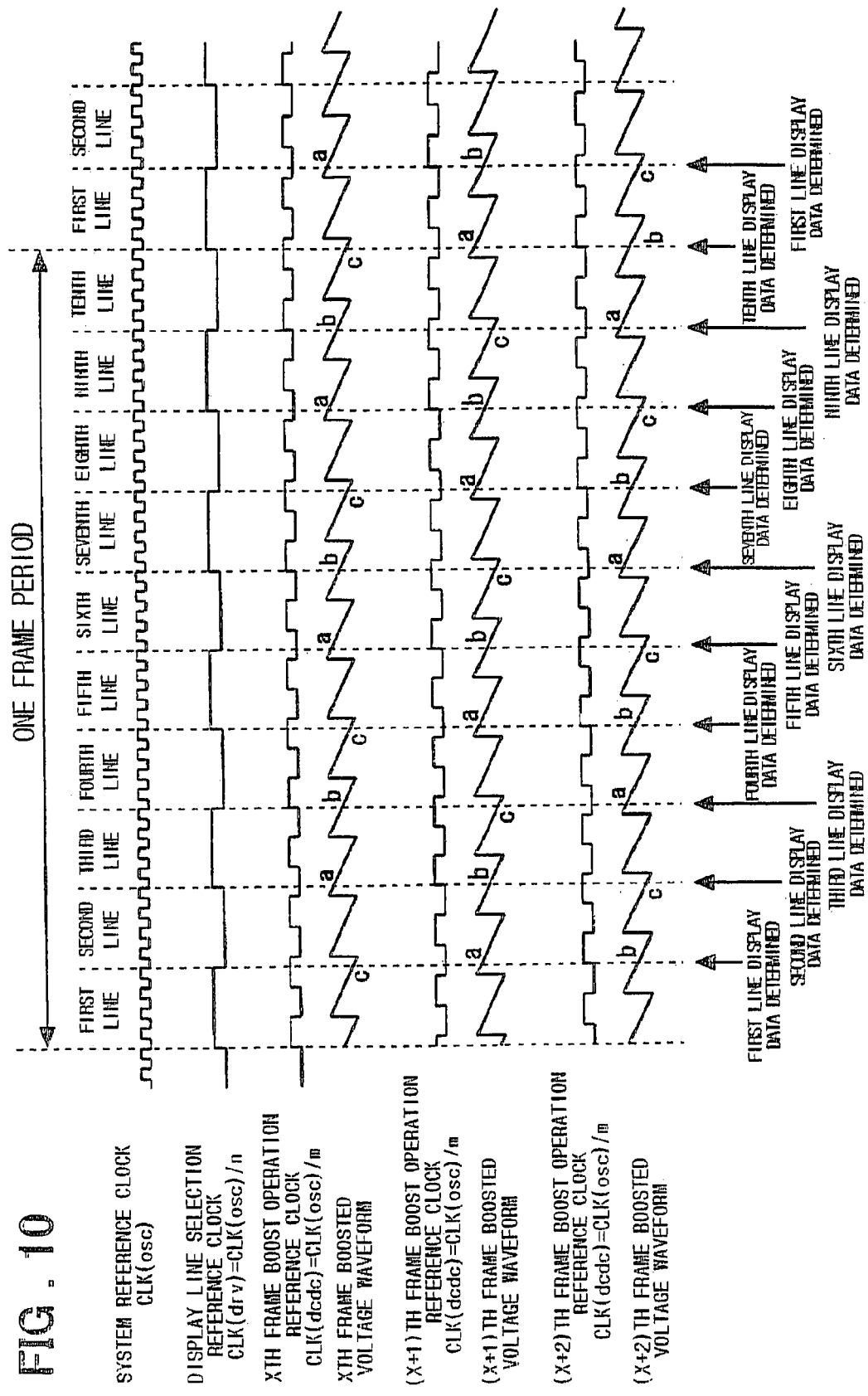
FIG. 10 is a timing waveform diagram for explaining an operation of the conventional display system.
Figure 11:
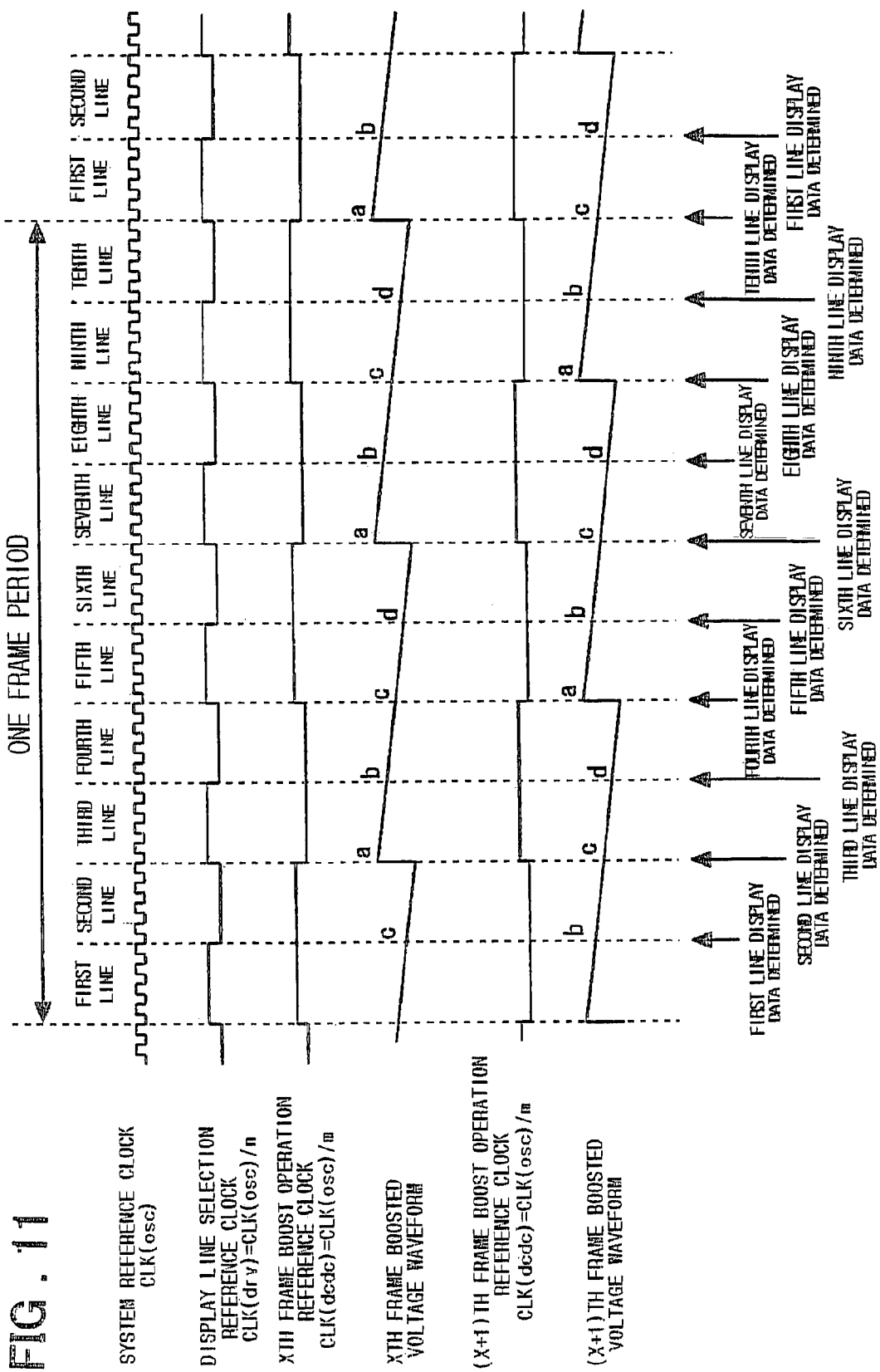
FIG. 11 is a timing diagram for explaining an operation of the conventional display system.

FIG. 8 is a diagram showing an example of generation of the boost operation reference clock signal CLK (drv)/n in the embodiment of the present invention, and corresponds to FIG. 2. More specifically, one line period is divided by four, and based on the reference clock signal CLK (osc), the boost operation reference clock signal CLK (drv)/n is generated. The boost operation reference clock signal CLK (drv)/n is equivalent to the signal obtained by four times frequency multiplication of the line selection reference signal CLK (drv). The boost operation reference clock signal CLK (drv)/n is synchronized with transition edges of the reference clock signal CLK (osc) and the line selection reference signal CLK (drv), and is also synchronized with the frame synchronization signal CLK (frm).

According to the power supply circuit system of the present invention, the operation of the power supply circuit is synchronized, using the signal for displaying a frame. Thus, even if the operating frequency is lowered so as to reduce current consumption, the grade of displayed image quality can be enhanced. For this reason, lower power dissipation and a higher grade can be both achieved.

Though the present invention was described in connection with the embodiments described above, the present invention is not limited to the configurations of the embodiments described above, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A power supply circuit for supplying power to a driver circuit which receives a line selection reference clock signal for selecting a display line to drive a scan line, said power supply circuit comprising:
   a circuit that, upon receiving a reference clock signal, generates from the received reference clock signal a frame synchronization signal and the line selection reference clock signal, and wherein the circuit generates a boost operation reference clock signal synchronized with both the line selection reference clock signal and the frame synchronization signal by performing frequency multiplication or division of the line selection reference clock signal;
   a circuit that, operating in synchronization with the frame synchronization signal, outputs a boost operation clock signal obtained on performing frequency division of the boost operation reference clock signal; and
   a boost circuit that performs a boost operation according to the boost operation clock signal to supply a boosted output voltage as a power supply voltage to said driver circuit.

2. A display system comprising:
   a first circuit that receives a reference clock signal and, based on the reference clock signal, outputs a frame synchronization signal and a line selection reference clock signal for selecting a display line;
   a second circuit that receives the frame synchronization signal and boost operation reference clock signal from the first circuit and that generates a boost operation clock signal synchronized at a start of each frame with the frame synchronization signal and with the line selection reference clock signal;
   a boost circuit, a boost operation thereof being controlled by the boost operation clock signal; and
   a driver circuit that, supplied with the line selection reference clock signal and with an output voltage of said boost circuit as a power supply voltage thereof drives a scan line associated with the line selection reference clock signal.

3. The display system according to claim 2, wherein the boost operation clock signal supplied to said boost circuit is synchronized with a predetermined transition edge of the line selection reference clock signal and a predetermined edge of the frame synchronization signal.

4. The display system according to claim 2, wherein the boost operation clock signal has k clock cycles in a period of one line, where k is a predetermined positive integer not less than one.

5. The display system according to claim 2, wherein one clock cycle of the boost operation clock signal includes k cycles of the line selection reference clock signal, where k is a predetermined positive integer not less than two.

6. The display system according to claim 2, wherein the line selection reference clock signal is obtained by frequency division of the reference clock signal by a predetermined frequency division ratio.

7. The display system according to claim 2, wherein the frame synchronization signal is inserted into a back porch period.

8. The display system according to claim 2, wherein one frame includes a plurality of display periods, and the frame synchronization signal is inserted into back porch periods prior to and subsequent to each display period.

9. The display system according to claim 2, wherein one frame includes a plurality of display periods, and the frame synchronization signal is inserted into a back porch period prior to a certain one of the display periods.

10. A display system comprising:
    an oscillation circuit that generates a reference clock signal;
    a counter circuit that, upon receiving the reference clock signal, generates from the received reference clock signal a frame synchronization signal and a line selection reference clock signal, wherein the counter circuit generates a boost operation reference clock signal synchronized with both the line selection reference clock signal and the frame synchronization signal by performing frequency multiplication or frequency division of the line selection reference clock signal;
    a frequency divider circuit that, upon receiving the frame synchronization signal as a reset signal thereof, outputs a boost operation clock signal obtained by performing frequency division of the boost operation reference clock signal;
    a boost circuit that performs a boost operation according to the boost operation clock signal; and
    a driver circuit that, upon being supplied with the line selection reference clock signal and with an output voltage from the boost circuit as a power supply voltage thereof, drives a scan line selected by the line selection reference clock signal.

11. The display system according to claim 10, wherein said boost circuit performs charging or discharging according to a logic value of an input voltage boosting operation clock signal.

12. The display system according to claim 10, wherein the boost operation clock signal supplied to said boost circuit is synchronized with a predetermined transition edge of the line selection reference clock signal and a predetermined edge of the frame synchronization signal.

13. The display system according to claim 10, wherein the boost operation clock signal has k clock cycles in a period of one line, where k is a predetermined positive integer not less than one.

14. The display system according to claim 10, wherein one clock cycle of the boost operation clock signal includes k cycles of the line selection reference clock signal, where k is a predetermined positive integer not less than two.

15. The display system according to claim 10, wherein the line selection reference clock signal is obtained by frequency division of the reference clock signal by a predetermined frequency division ratio.

16. The display system according to claim 10, wherein the frame synchronization signal is inserted into a back porch period.

17. The display system according to claim 10, wherein one frame includes a plurality of display periods, and the frame synchronization signal is inserted into back porch periods prior to and subsequent to each display period.

18. The display system according to claim 10, wherein one frame includes a plurality of display periods, and the frame synchronization signal is inserted into a back porch period prior to a certain one of the display periods.

* * * * *